United States Patent
Yu

(10) Patent No.: US 7,798,393 B2
(45) Date of Patent: Sep. 21, 2010

(54) METHOD AND SYSTEM FOR RESTRICTING USE OF ADDITIONAL FUNCTIONS IN A MOBILE TERMINAL

(75) Inventor: Bong-Ju Yu, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 527 days.

(21) Appl. No.: 11/399,249

(22) Filed: Apr. 6, 2006

(65) Prior Publication Data
US 2006/0240809 A1    Oct. 26, 2006

(30) Foreign Application Priority Data
Apr. 20, 2005    (KR) ................... 10-2005-0032922

(51) Int. Cl.
G06K 5/00    (2006.01)
(52) U.S. Cl. ..................... 235/375; 235/382
(58) Field of Classification Search ............ 235/375, 235/376, 382, 382.5; 380/258
See application file for complete search history.

(56) References Cited

U.S. PATENT DOCUMENTS

| 5,243,652 | A |   | 9/1993  | Teare et al. |            |
|-----------|---|---|---------|--------------|------------|
| 6,081,600 | A | * | 6/2000  | Blanchard et al. | 380/255 |
| 6,470,085 | B1 | * | 10/2002 | Uranaka et al. | 380/231 |
| 2003/0108202 | A1 | * | 6/2003 | Clapper | 380/258 |
| 2004/0137878 | A1 | * | 7/2004 | Oyama | 455/411 |
| 2004/0147255 | A1 | * | 7/2004 | Lee | 455/422.1 |

FOREIGN PATENT DOCUMENTS

| GB | 2395304       | 5/2004  |
|----|---------------|---------|
| WO | WO 02/056162  | 7/2002  |
| WO | WO 2004/089021 | 10/2004 |

* cited by examiner

Primary Examiner—Thien M Le
(74) Attorney, Agent, or Firm—The Farrell Law Firm, LLP

(57) ABSTRACT

A method of restricting the use of at least one additional function in a mobile terminal is provided. The mobile terminal generates new data by executing an additional function of the mobile terminal. The mobile terminal encrypts the data with currently received location information, upon receipt of a restriction signal, stores the encrypted data, and upon request for reading of the stored data decrypts the stored data with currently received location information.

15 Claims, 4 Drawing Sheets

METHOD AND SYSTEM FOR RESTRICTING USE OF ADDITIONAL FUNCTIONS IN A MOBILE TERMINAL

PRIORITY

This application claims priority under 35 U.S.C. §119 to an application entitled "Method and System for Restricting Use of Additional Functions in a Mobile Terminal" filed in the Korean Intellectual Property Office on Apr. 20, 2005 and assigned Serial No. 2005-32922, the contents of which are incorporated herein by reference.

BACKGROUND OF THE INVENTION

1. Field of the Invention

The present invention relates generally to a mobile terminal, and in particular, to a method and system for partially restricting the use of additional functions of a mobile terminal within a particular area.

2. Description of the Related Art

The proliferation of mobile terminals has accelerated the deployment of various additional functions besides the basic call functionality. The additional functions include a digital camera function for capturing still images and moving pictures, a download function for downloading data from a computer, and a recording function for recording voice or sounds input through a microphone. Despite increased user convenience and fun, the use of such additional functions faces new problems including loss of privacy, illegal information acquisition and distribution, and leakage of security information. For example, some users illegally copy book contents or visually record inside theaters by a phone camera, download confidential data of a company, or secretly record a conversation. Such illegal information acquisition is more harmful when the illegal information is distributed to an unspecified number of people on the Internet than when the illegal information is personally preserved.

In this context, many methods have been proposed to restrict the additional functions of mobile terminals when needed. For example, a mobile terminal is configured to create a specific sound, issue a notification message, or flash light when it photographs. Also, a system can be configured to block the execution of additional functions in a particular area.

Being notified of the execution of an additional function by generating some sound is rather a passive approach. With the passive approach, illegal data acquisition and leakage by the additional function is not prevented. Moreover, blocking the execution of the additional function itself requires implementation of an additional system and leads to a restriction of the use of the additional function even in a restriction area, apart from prevention of illegal information acquisition and leakage. Consequently, user inconvenience is caused and resources are dissipated.

SUMMARY OF THE INVENTION

To substantially solve at least the above problems and/or disadvantages, the present invention provides a method and system for efficiently restricting the use of additional functions in a mobile terminal.

The present invention also provides a method and system for preventing acquisition and leakage of security information through a mobile terminal.

The above objects are achieved by providing a method of restricting the use of an additional function in a mobile terminal.

According to one aspect of the present invention, in a method of restricting the use of at least one additional function in a mobile terminal, new data is generated by executing an additional function of the mobile terminal. The data is encrypted with currently received location information, upon receipt of a restriction signal, and stored. Upon request for reading of the stored data, the stored data is decrypted with currently received location information.

According to another aspect of the present invention, in a system for restricting the use of at least one additional function of a mobile terminal, a BTS broadcasts a restriction signal in a restriction area. A mobile terminal generates new data by executing an additional function of the mobile terminal, upon request of a user, encrypts the data with currently received location information, upon receipt of a restriction signal, stores the encrypted data, and decrypts the stored data with currently received location information, upon request for reading of the stored data.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 1:
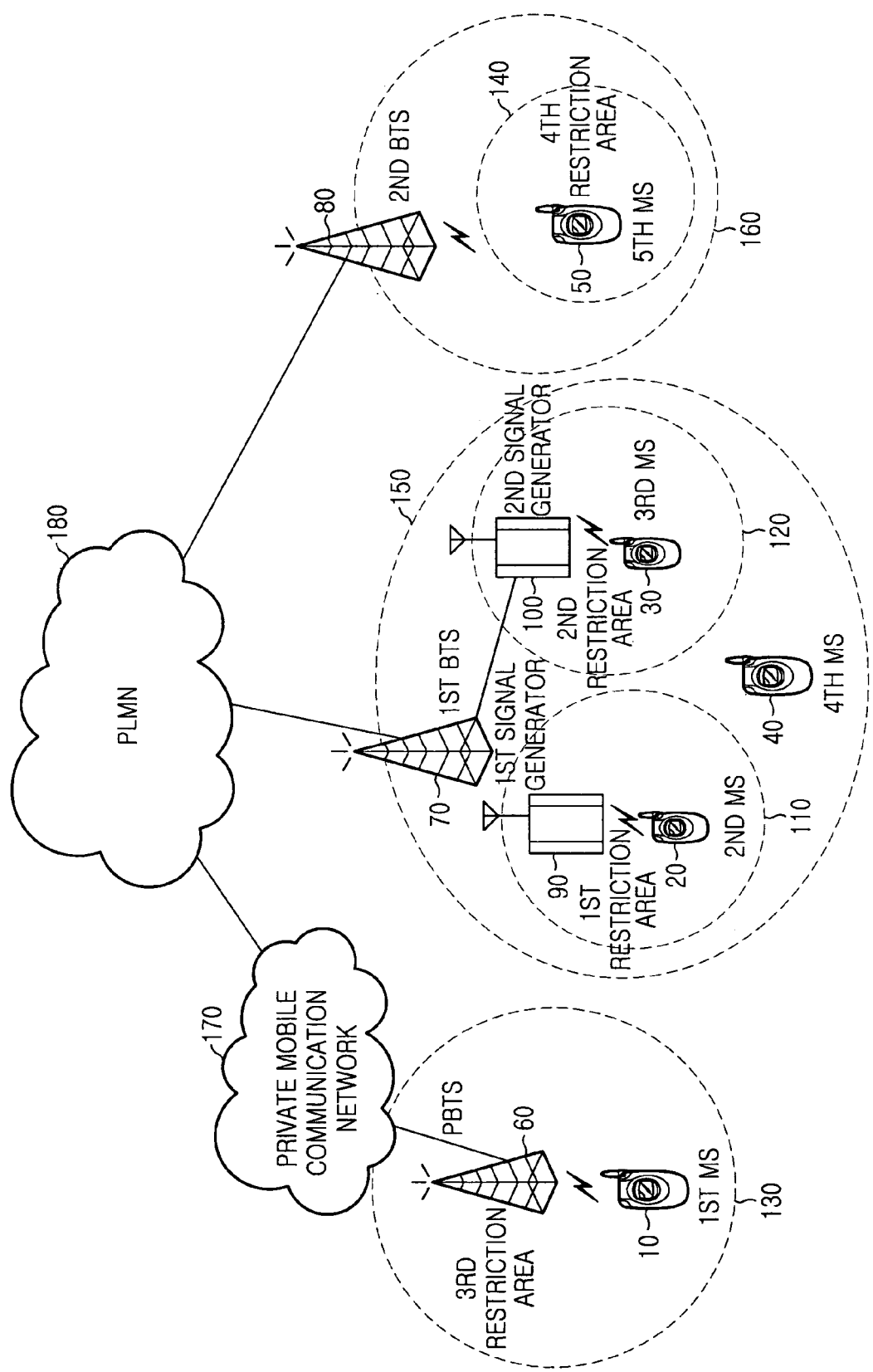
FIG. 1 illustrates a mobile communication system according to an embodiment of the present invention.

Referring to FIG. 1, a mobile communication system for restricting the use of at least one additional function of a mobile terminal (i.e. a mobile station: MS) according to the embodiment of the present invention includes a Public Land Mobile Network (PLMN) 180, a plurality of Base Transceiver Stations (BTSs) 70 and 80, a private mobile communication network 170, a Private BTS (PBTS) 60, a plurality of signal generators 90 and 100, and a plurality of MSs 10 to 50.

While not shown, the PLMN 180 is comprised of a plurality of switching centers, a plurality of Base Station Controllers (BSCs), a plurality of BTSs, and a plurality of location registers, for providing public mobile services.

The BTSs 70 and 80 (first and second BTSs) are connected to the PLMN 180 and wirelessly communicate with MSs within their coverage areas.

While not shown, the private mobile communication network 170 includes a plurality of private switches, a plurality of private BSCs, and a plurality of location registers. The private mobile communication network 170 provides public mobile services to all MSs within its service area, interworking with the PLMN 180. The private mobile communication network 170 also provides private mobile services only to MSs subscribed to them.

The PBTS 60, connected to the private mobile communication network 170, provides private mobile services and wirelessly communicates with MSs within its service area.

In accordance with the present invention, an additional function restriction service is provided to MSs located in restriction areas through the PLMN 180, the private mobile communication network 170, the first and second BTSs 170 and 180, and the PBTS 60. The additional function restriction service is set up to prevent data generated or acquired by additional functions of a MS in a particular area from being removed from the particular area. The additional function restriction service is provided such that a BTS broadcasts a restriction signal over a corresponding restriction area under the control of a mobile communication network, and an MS encrypts additional function data acquired or generated by the use of an additional function with currently received location information, prior to storing the data, and upon a request to read the encrypted additional function data, decrypts the stored data with currently received location information.

A BTS broadcasts a restriction signal over a corresponding restriction area, directly or through a signal generator. The signal generator is connected to the BTS wirelessly or by cable, and broadcasts the restriction signal received from the BTS within a local area. The coverage of the signal generator can be adjusted according to the restriction area. For example, when a building is designated as a restriction area, the signal generator is installed in the building and the coverage of the signal generator is set so that the restriction signal reaches within an area including the building.

In the case of direct transmission from the BTS, the BTS transmits the restriction signal to an MS in a restriction area. The BTS can locate the MS using Global Positioning System (GPS) signals or a pilot signal. In the former case, the distances between a GPS satellite and GPS receivers are calculated using a code carried on a GPS carrier signal from the GPS satellite and the position of the MS is calculated based on the distances. In the latter case, the distances between the MS and Base Stations (BSs), which are synchronized to each other, are calculated using the Pseudo Noise (PN) phase of pilot signals from the BSs and the position of the MS is calculated based on the distances.

The restriction area is set by request of a subscriber to the additional function restriction service. A private mobile communication service area, the coverage area of a BTS, or an area such as a building, can be designated as a restriction area.

Such restriction areas are shown in FIG. 1. First and second restrictions areas 110 and 120 are part of the service area 150 of the first BTS 70. The first and second signal generators 90 and 100 are responsible for transmitting a restriction signal in the first and second restriction areas 110 and 120, respectively. The first signal generator 90 receives the restriction signal wirelessly from the first BTS 70 and the second signal generator 100 receives the restriction signal from the first BTS 70 by cable.

A third restriction area 130 is the coverage area of the PBTS 60 and receives a restriction signal form the PBTS 60.

A fourth restriction area 140 is part of the coverage area 160 of the second BTS 80. The second BTS 80 directly transmits a restriction signal to the fourth restriction area 140. In the illustrated case of FIG. 1, a fifth MS 50 receives the restriction signal in the fourth restriction area 140. The second BTS 80 preliminarily stores information about the fourth restriction area 140.

MSs such as the MSs 10, 20, 30 and 50 located in the restriction areas find out that they are located in the restriction areas by receiving restriction signals from the BTSs 60 and 80 and the signal generators 90 and 100. In storing data generated or acquired by restricted additional functions, that is, restricted functions during receiving the restriction signals, they encrypt the additional function data using currently received location information. The restricted functions are defined by request of a subscriber to the additional function restriction service. Any of additional functions available in a mobile terminal can be restricted. For example, image photographing, moving picture photographing, download, and voice recording can be set as restricted functions. They commonly have the greatest potential to be used for acquisition and dissemination of information to be protected in restriction areas. Upon a request for reading the encrypted additional function data, the MS decrypts the data with currently received location information.

Figure 2:
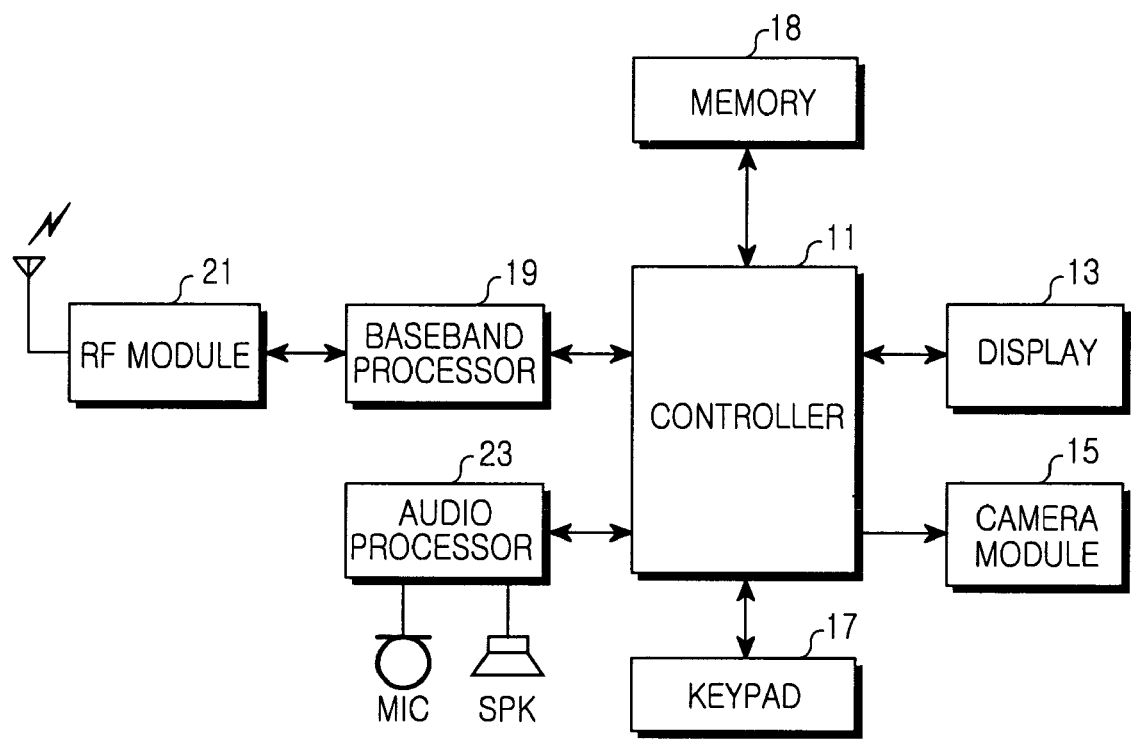
FIG. 2 is a block diagram of a mobile terminal to which the present invention is applied.

FIG. 2 is a block diagram of such an MS to which the present invention is applied. Referring to FIG. 2, the MS includes a controller 11, a memory 18, a keypad 17, a display 13, a camera module 15, a baseband processor 19, a Radio Frequency (RF) module 21, and an audio processor 23.

The keypad 17 has alphanumerical keys including 0 to 9, * and #, and function keys including Menu, Select, Send, Clear, Power/End, Volume keys by which to invoke corresponding functions. The keypad 17 provides key input data corresponding to a key pressed by a user. The camera module 15 outputs image frames captured by an image sensor. The display 13 displays visual information, and images captured by the camera module 15, received from a BTS, or stored in the memory 18 under the control of the controller 11.

The RF module 21 transmits/receives a radio signal to/from the BTS via an antenna. The RF module 21 modulates a transmission signal received from the controller 11 through the baseband processor and transmits the resulting RF signal through the antenna. The RF module 21 also demodulates an RF signal received through the antenna and provides the demodulated signal to the controller 11 through the baseband processor 19. The baseband processor 19 processes the baseband signals transmitted/received between the RF module 21 and the controller 11.

The audio processor 23 connected to the controller 11 and a microphone and a speaker connected to the audio processor 23 are used for voice call and voice recording.

The memory 18 stores programs needed for processing and controlling in the controller 11, reference data, updatable data to be kept, and a variety of multimedia data. The memory 18 also serves as an active memory for the controller 11. In accordance with the embodiment of the present invention, the memory 18 stores restriction mode program data and information about additional functions set as restricted. A restriction mode is triggered by the reception of a restriction signal. In the restriction mode, the MS monitors reception of a restriction signal when storing restricted function data generated or acquired by use of a restricted function. Upon receipt of the restriction signal, the MS encrypts the restricted function data with currently received location information, for storing the restricted function data. Upon a request for reading the restricted function data, the MS decrypts the encrypted restricted function data using currently received location information.

Figure 3:
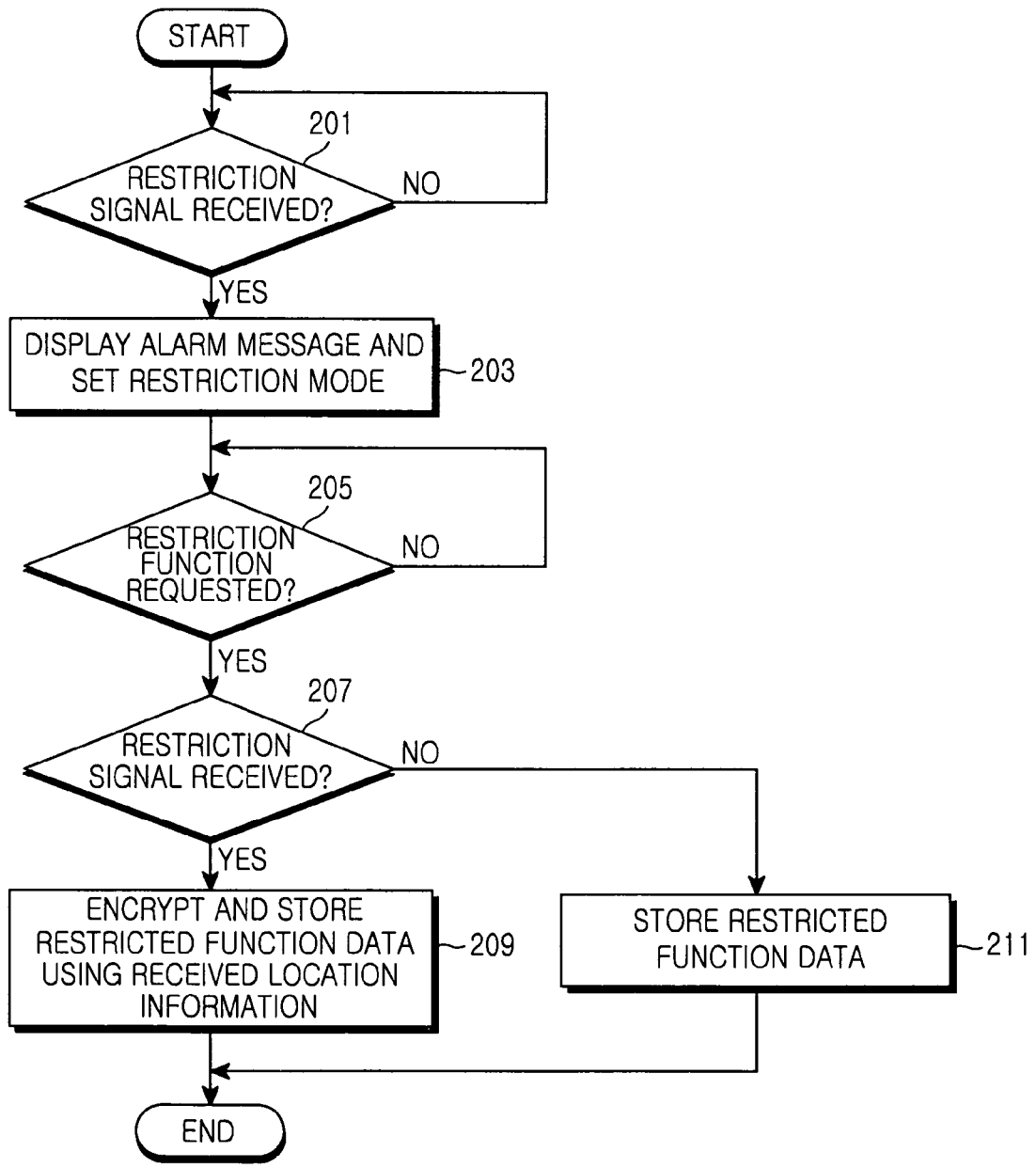
FIG. 3 is a flowchart illustrating an operation for storing data generated by the use of a restricted function in a mobile terminal according to an embodiment of the present invention.

FIG. 3 is a flowchart illustrating an operation for storing data generated by the use of a restricted function in an MS according to an embodiment of the present invention and FIG.

4 is a flowchart illustrating an operation for reading restricted function data in the MS according to an embodiment of the present invention.

Referring to FIG. 3, the controller 11 monitors reception of a restriction signal in step 201. Upon receipt of the restriction signal, the controller 11 displays a restriction area alarm message and sets a restriction mode in step 203. In step 205, the controller 11 determines if the user has requested a restricted function. Upon request of a restricted function, the controller 11 goes to step 207. The restricted function can be image photographing, moving picture photographing, download, or voice recording. In step 207, the controller 11 determines if a restriction signal is being received. Upon receipt of the restriction signal, the controller 11 performs the restricted function, encrypts restricted function data generated by use of the restricted function with currently received location information, stores the encrypted data in step 209. For instance, upon generation of image data by request of the user for image photographing, the image data is encrypted with received location information and then stored. In the absence of the restriction signal, the controller 11 just stores the restricted function data in step 211.

Figure 4:
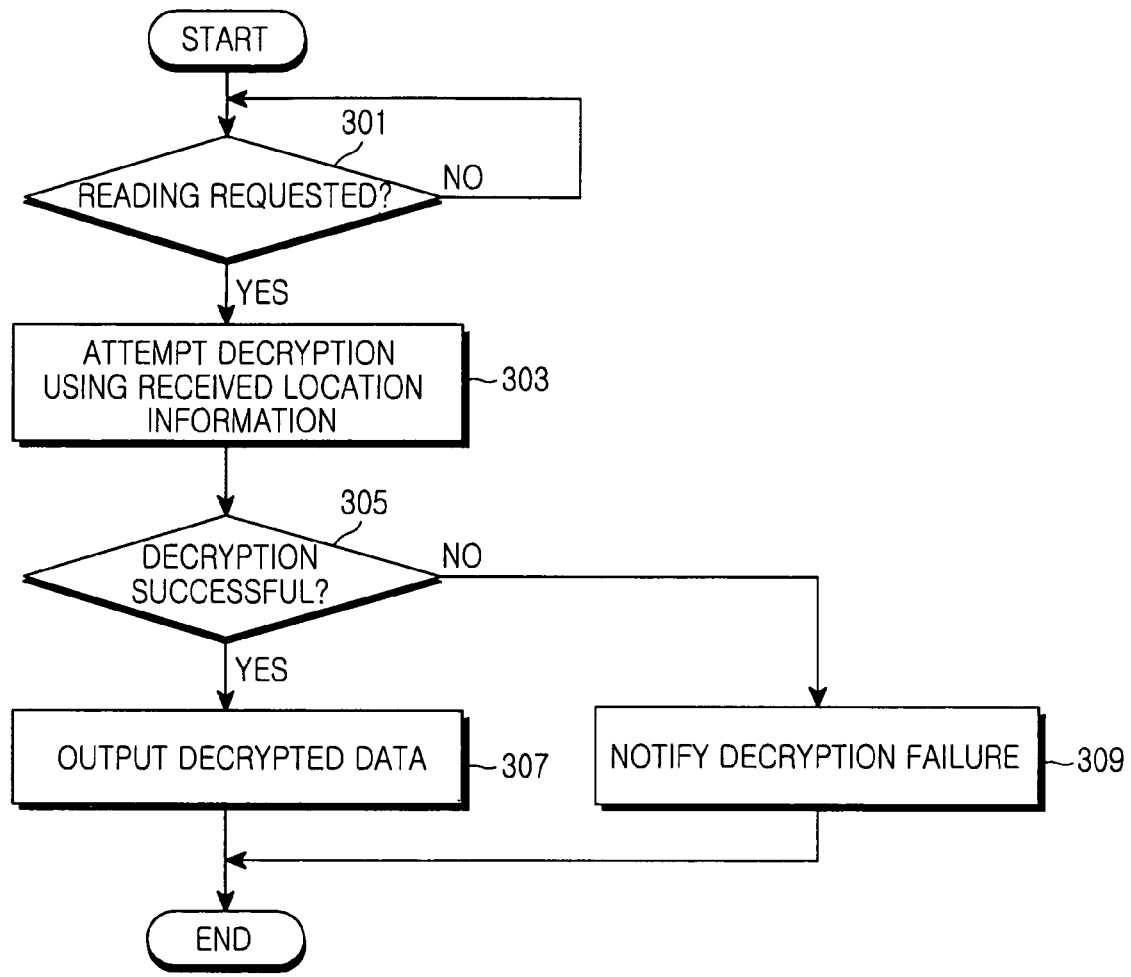
FIG. 4 is a flowchart illustrating an operation for reading restricted function data in the mobile terminal according to an embodiment of the present invention.

Referring to FIG. 4, upon a request for reading of the encrypted restricted function data in step 301, the controller 11 attempts to decrypt the restricted function data with currently received location information in step 303 and determines if the decryption has been completed in step 305. If the decryption is successful, the controller 11 provides the decrypted data in step 307 and ends the procedure. If the decryption fails, the controller 11 provides a decryption failure message in step 309 and ends the procedure. If the MS is located in a restriction area, the received location information is still valid for storing the restricted function data and thus the MS can retrieve and decrypt the restricted function data with the location information. If the MS moves out of the restriction area, the location information is changed. As a result, the MS cannot decrypt the encrypted restricted function data. In this way, the use of restricted function data generated or acquired in a restriction area is confined to the restriction area. It cannot be utilized outside the restriction area.

In accordance with the present invention as described above, a BTS broadcasts a restriction signal in a corresponding restriction area under the control of a mobile communication network. Upon receipt of the restriction signal, an MS encrypts data acquired or generated by the use of a restricted additional function with currently received location information and stores the encrypted data. Upon a request for reading of the encrypted additional function data, the MS decrypts the data with currently received location information. Therefore, information dissemination is prevented and an additional function can be used freely even in a restriction area, when necessary.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of restricting the use of at least one additional function in a mobile terminal, comprising the steps of:
   generating new data by executing an additional function of the mobile terminal;
   determining whether a restriction signal for restricting the additional function within a restriction area is received at the mobile terminal from a signal generator;
   if the restriction signal is received from the signal generator, encrypting the new data with currently received location information from the signal generator, wherein the currently received location information corresponds to the restriction area, and storing the encrypted data; and
   decrypting the stored data with the currently received location information, upon receiving a request for reading of the stored data when the mobile terminal is within the restriction area;
   wherein the signal generator is connected to a Base Transceiver Subsystem (BTS) and broadcasts the restriction signal received from the BTS within the restriction area.

2. The method of claim 1, further comprising the step of, if the decryption fails, providing a decryption failure message.

3. The method of claim 1, wherein the restriction signal is received from a mobile communication network.

4. The method of claim 1, wherein the restricted additional function is image photographing.

5. The method of claim 1, wherein the restricted additional function is moving picture photographing.

6. The method of claim 1, wherein the restricted additional function is large-volume data download.

7. The method of claim 1, wherein the restricted additional function is voice recording.

8. A method of restricting the use of at least one additional function in a mobile terminal, comprising the steps of:
   broadcasting by a Base Transceiver Subsystem (BTS) a restriction signal for an additional function in a restriction area;
   notifying by the mobile terminal a user of the restriction area, upon receipt of the restriction signal in the restriction area;
   generating new data by executing the additional function of the mobile terminal;
   encrypting the new data with currently received location information from the BTS upon receipt of the restriction signal, wherein the currently received location information corresponds to the restriction area, and storing the encrypted data by the mobile terminal; and
   decrypting, by the mobile terminal, the stored data with the currently received location information, upon receiving a request for reading of the stored data when the mobile terminal is within the restriction area.

9. The method of claim 8, further comprising the step of, if the decryption fails, providing a decryption failure message by the mobile terminal.

10. A system for restricting the use of at least one additional function of a mobile terminal, comprising:
    a Base Transceiver Subsystem (BTS) for broadcasting a restriction signal for restricting an additional function in a restriction area; and
    a mobile terminal for generating new data by executing the additional function of the mobile terminal, upon receipt of the restriction signal encrypting the new data with currently received location information from the BTS, wherein the currently received location information corresponds to the restriction area, storing the encrypted data, and upon receiving a request for reading of the stored data when the mobile terminal is within the restriction area, decrypting the stored data with the currently received location information.

11. The system of claim 10, further comprising a signal generator for receiving the restriction signal and broadcasting the restriction signal to the restriction area.

12. A method of restricting the use of at least one additional function in a mobile terminal, comprising the steps of:

generating new data by executing an additional function of the mobile terminal;

determining whether a restriction signal for restricting the additional function within a restriction area is received at the mobile terminal from a Base Transceiver Subsystem (BTS);

if the restriction signal is received from the BTS, encrypting the new data with current location information received from the BTS, wherein the current location information corresponds to the restriction area, and storing the encrypted data; and decrypting the stored data with the current location information, upon receiving a request for reading of the stored data when the mobile terminal is within the restriction area.

13. The method of claim 12, wherein the additional function is image photographing.

14. The method of claim 12, wherein the additional function is moving picture photographing.

15. The method of claim 12, wherein the additional function is voice recording.

* * * * *